Oct. 4, 1927. 1,644,032
W. RAHE
AUTOMOBILE BUMPER
Filed Feb. 1, 1926
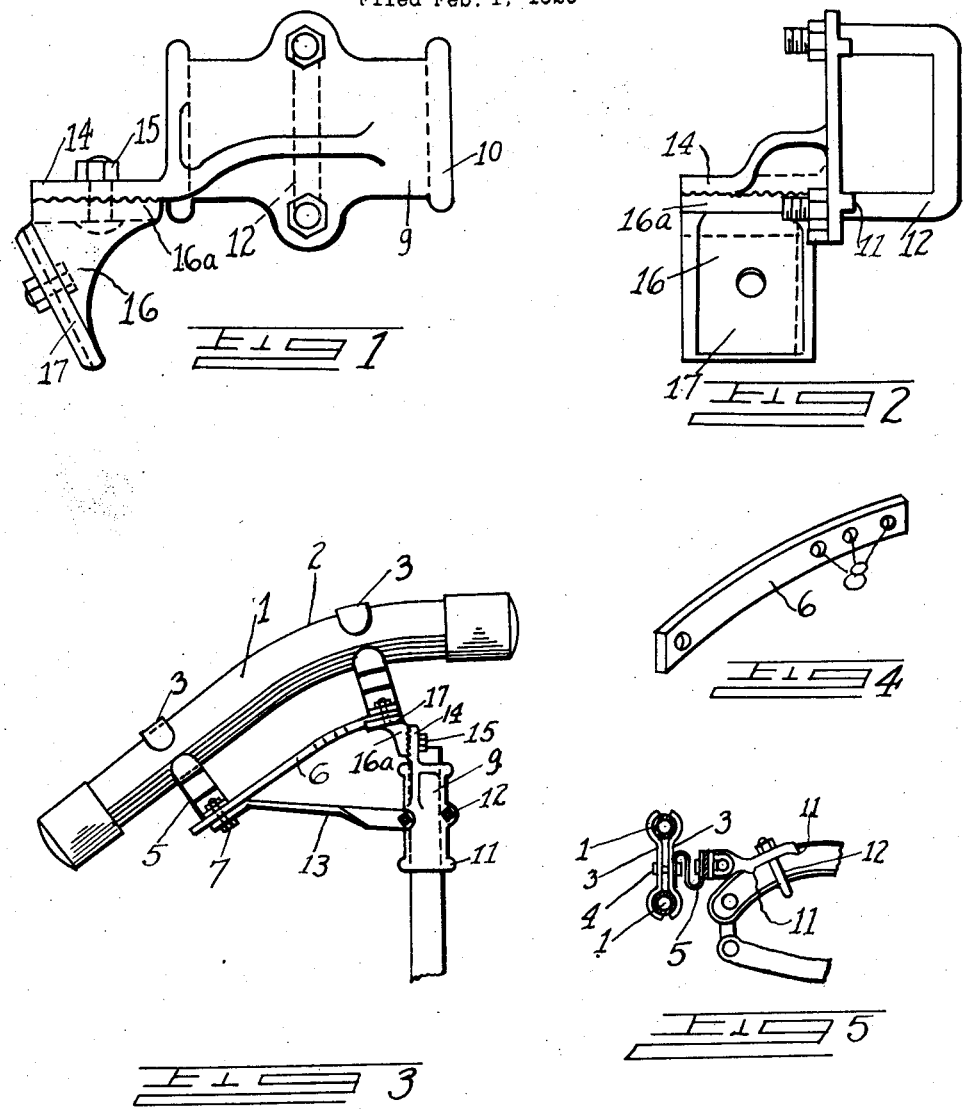

Patented Oct. 4, 1927.

1,644,032

UNITED STATES PATENT OFFICE.

WILLIAM RAHE, OF CINCINNATI, OHIO.

AUTOMOBILE BUMPER.

Application filed February 1, 1926. Serial No. 85,195.

My invention relates to bumpers of the type known as bumperettes, because they are applied to the frame of a vehicle in such a way as to protect but one mud guard, instead of extending clear across the vehicle at front or back. These devices are usually employed at the rear of the car.

It is the object of my invention to provide a bumper of the type described which is adapted for use with a wide variety of automobiles, and can be quickly and easily set in place thereon. Thus my device is adjustable in mounting both lengthwise and vertically of the vehicle.

It is my object to provide a clamping element for mounting the bumpers on the frame so that the mounting device will not develop a tendency to shear the flanges of the frame channels.

Another object of my invention is to provide a pair of tubular bars supported on springs, said bars being bent at a point which is not central of the bars, so as to place the greatest strength of the device to resist blows where they are likely to come, and to avoid too great an angle or curve in the bars. Specifically I place the bend as near the line of the vehicle as possible.

Finally in structure it is my object to gain strength and resiliency, so as to effectively protect the vehicle from contact with objects with any force to be anticipated in practice.

I accomplish my objects by that certain construction and arrangement of parts to be hereinafter more specifically pointed out and claimed.

In the drawing:

Figure 1 is a detail plan of the mounting device.

Figure 2 is a side elevation thereof.

Figure 3 is a plan view of a bumper mounted on the right hand rear corner of a vehicle.

Figure 4 is a perspective of the spring connecting plate.

Figure 5 is a detail section of the bumper in place on the frame of a vehicle, the mounting devices being in elevation.

The bumper is formed of a pair of bars 1, which are formed with a bend at 2. A pair of clips in the form of straight plates with curves in the ends as shown at 3, are held by means of suitable bolts 4 to the springs 5. These springs are illustrated as having an S-shape, the outer ends bolted to the clips and the inner ends mounted on the supporting elements of the bumper.

The clips engage around the bars and hold them tightly, and permit of some lengthwise adjustment of the bars to suit conditions. The bends or curves 3 are made nearer one end of the two bars, which end is brought closest to the vehicle.

The two springs are connected by a plate 6, which is bolted to the springs by bolts 7, thereby holding the springs in fixed spaced relation. The plate 6 has a series of holes 8 therein for adjusting the mounting.

Secured to the frame of the vehicle is a plate 9, which has ribs 10 to seat on the top of the frame channel, thus clearing any rivets therein, and also has nibs or ears 11, to engage over the side edges of the frame channels, thus holding the plates from rocking, and cutting out or side shearing.

The plate has holes therein for receiving the U-bolts 12, which are set around the frame bar in mounting the device, and the nuts turned down to hold it tightly in place.

One of the tines of the U-bolts is used in normal practice to pass through a strut 13, which extends to the forward end of the plate 6, where it is secured to the spring of the bumper by the same bolt that secured the plate 6 thereto.

The frame engaging plate is formed as a casting having a circular toothed disk 14 thereon, with a central hole for a bolt 15. A casting 16 is provided having a like toothed disk 16ª and a hole for the bolt. This casting is formed in an angle, having the wall 17 to be secured to the plate 6 that connects the two bumper springs at 65° to the disk 16ª.

When the relation of the frame to the fenders or mud guards of the vehicle is such that the bumper should be placed as far forward of the vehicle as practical, the wall 17 of the angle plate is secured to the rear-most spring by the bolt which holds the plate 6 thereto. Thus the mounting devices for the bumper are central to the bumper, but extend laterally from the frame, leaving a clear space at the rear of the car for other devices. Also the bumper conforms to the line of the car, and diverts laterally away from the car, such blows as are received from behind.

When it is desired to mount the bumper further to the rear of the vehicle, the angle plate wall 17 is secured by a separate bolt in some other one of the holes in the plate 6.

In adjusting the position of the bumper vertically with relation to the vehicle, the angle plate is revolved with relation to the frame engaging plate, bringing the two disks 14 and 16ᵃ to the desired relation, whereupon the bolt 15 is employed for securing them together in fixed relation, the teeth taking the majority of the twisting strains, if applied to the mechanism.

When the device is secured in more rearward positions, the strut 13 may be omitted, or a separate short one substituted. The strut is not required when the mounting elements are nearer the middle of the plate 6.

It will be noted that by making up the parts of the mounting plates as castings I am enabled to rib them well for strength, and that the various adjustments of my devices will make them applicable to a wide variety of vehicles.

It will be preferable to have a right and left frame plate, to avoid making different adjustments and reversing any parts. The structure shown is a right, and a left will merely reverse the casting.

Having thus described my invention, what I claim as new and desire to secure by Letters Patent, is:—

1. In combination a bump receiving element, springs for retaining said element in resilient support, a bar connecting the springs, a clamp on the frame of a vehicle, and means on the clamp adapted to engage the bar in a plurality of clamped positions.

2. In combination a bump receiving element, springs for retaining said element in resilient support, a member secured to the springs in a plurality of positions and having a toothed disk forming part thereof, a member clamped to the frame of the vehicle and having a toothed disk, and means for securing said toothed disks together.

3. A bumper comprising a resilient jar receiving assembly, and means for mounting said assembly to the frame of a vehicle comprising a plate having nibs to engage over the sides of the frame bar of the vehicle, and bolts arranged to clamp the plate down on the frame of the vehicle, and a revolving clamped joint between the said plate and the said assembly.

4. A bumper comprising a resilient jar receiving assembly, and means for mounting said assembly to the frame of a vehicle comprising a plate having nibs to engage over the sides of the frame bar of the vehicle, and bolts arranged to clamp the plate down on the frame of the vehicle, and a revolving clamped joint between the said plate and the said assembly, and means for adjustably securing the said jointed parts to the said assembly.

WILLIAM RAHE.